United States Patent
Roscoe et al.

(10) Patent No.: US 7,953,827 B2
(45) Date of Patent: *May 31, 2011

(54) SYSTEM AND METHOD FOR DYNAMIC ALLOCATION OF INFORMATION HANDLING SYSTEM NETWORK ADDRESSES

(75) Inventors: Brett Roscoe, Austin, TX (US); Michael Falsone, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 766 days.

This patent is subject to a terminal disclaimer.

(21) Appl. No.: 11/554,883

(22) Filed: Oct. 31, 2006

(65) Prior Publication Data
US 2008/0104243 A1   May 1, 2008

(51) Int. Cl.
*G06F 15/177* (2006.01)
*G06F 15/173* (2006.01)
*G06F 1/00* (2006.01)

(52) U.S. Cl. .................. 709/220; 713/300; 709/226

(58) Field of Classification Search .................. 709/223, 709/224, 225, 204–205
See application file for complete search history.

(56) References Cited

U.S. PATENT DOCUMENTS

| | | | |
|---|---|---|---|
| 5,854,901 A * | 12/1998 | Cole et al. | 709/245 |
| 6,877,042 B2 | 4/2005 | Tawil et al. | 709/250 |
| 2003/0088655 A1 * | 5/2003 | Leigh et al. | 709/223 |
| 2003/0200399 A1 * | 10/2003 | Dawkins et al. | 711/152 |
| 2005/0138439 A1 * | 6/2005 | Rothman et al. | 713/300 |

FOREIGN PATENT DOCUMENTS

JP   2007122698 A  *  5/2007

OTHER PUBLICATIONS

Hairong-Sun et al; Optimizing service strategy for systems with deferred repair.;2005; IEEE,;2006018.;6-11.*

* cited by examiner

*Primary Examiner* — Ashok B Patel
*Assistant Examiner* — Evans Desrosiers
(74) *Attorney, Agent, or Firm* — Hamilton & Terrile, LLP; Robert W. Holland

(57) ABSTRACT

Network addresses are dynamically allocated to blade information handling systems supported by a blade chassis having plural blade slots. A network address seed stored in memory associated with the blade chassis is retrieved by a management controller of a blade information handling system and applied by a network address generator to local network address information to generate a network address. The generated network address is applied by the management controller to a network component of the blade information handling system to establish communications over a network. For example, a WWN generated from a blade chassis seed address provides a blade information handling system host bus adapter access to a storage area network for boot from SAN support for the blade information handling system.

20 Claims, 2 Drawing Sheets

SYSTEM AND METHOD FOR DYNAMIC ALLOCATION OF INFORMATION HANDLING SYSTEM NETWORK ADDRESSES

BACKGROUND OF THE INVENTION

1. Field of the Invention

The present invention relates in general to the field of information handling system networking, and more particularly to a system and method for the dynamic allocation of information handling system network addresses.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The growing use of information handling system networks has driven enterprises to seek reliable and compact server information handling systems to service networks. Rack dense blade server information handling systems have become a plausible alternative to traditional monolithic servers to prepare data centers with "cold stand-by" server resources. Blade information handling systems operate out of a common chassis so that greater processing capability is managed in a reduced footprint. In the event of a failure, replacing a blade server information handling system within a blade chassis instead of server components within a monolithic server offers end users a more rapid and less complex way to maintain server resource availability in a data center environment. As an example, blade server information handling systems provide a convenient platform for managing storage of information in a storage area network (SAN). A Fibre Channel (FC) Host Bus Adapter (HBA) interfaces each blade information handling system with a SAN to support storage and retrieval of information on storage devices of the SAN. In order to track interactions between HBAs and the SAN, each HBA has a unique World Wide Name (WWN), which is a 64 bit address typically populated at manufacture. The uniqueness of the WWN is leveraged in a SAN to facilitate array-to-host LUN masking and to perform zoning on FC switches.

Although replacement of blade information handling systems provides a convenient way of addressing hardware failures in a network, a difficulty arises when the replacement blade information handling system's network address is different from the network address being used for communication with other network devices. For instance, replacement of a blade server information handling system or an FC HBA introduces a new WWN to the network that typically requires end user administrative actions on FC switches and within the storage array to resume normal operations. Such administrative actions typically include manual changes to the switch zoning and array-to-LUN masking so that the blade information handling system can retain or resume access to SAN storage devices. Manual administrative changes to the network configuration create opportunities for the introduction of errors, require administrative expertise and delay full availability of server resources. These difficulties take from the advantages provided by the component architecture of blade information handling systems for rapid replacement of faulty server resources.

SUMMARY OF THE INVENTION

Therefore a need has arisen for a system and method which dynamically allocates information handling system network addresses.

In accordance with the present invention, a system and method are provided which substantially reduce the disadvantages and problems associated with previous methods and systems for allocating information handling system network addresses. Network addresses are dynamically allocated to information handling systems by applying a common network address seed to local network address information at each information handling system to generate a network address for a networking component.

More specifically, a blade chassis has plural slots, each slot supporting a blade information handling system. Memory associated with the blade chassis stores a network address seed. A management controller on each blade information handling system retrieves the network address seed while the associated blade information handling system is powered down. A network address generator associated with the management controller applies the network address seed to local network address information to generate a network address for use by a networking component of the blade information handling system. For example, the network address generator applies a host bus adapter location in the blade information handling system and the blade information system's slot in the blade chassis to generate a WWN address for interfacing the host bus adapter with a storage area network. The management controller applies the WWN address to the host bus adapter to support communication with the storage area network at power up of the blade information handling so that, for instance, the host bus adapter supports boot from the SAN of the blade information handling system.

The present invention provides a number of important technical advantages. One example of an important technical advantage is that network addresses are dynamically allocated to a replacement blade information handling system so that the blade information handling system automatically retains or resumes network communication. A unique WWN established for a blade information handling system is applied to its replacement so that FC switch zoning and array-to-LUN masking do not need manual administrative adjustments; the replacement blade information handling system provides "cold stand-by" capability without requiring changes to the network or storage devices. Further, the replacement blade server information handling system has improved "boot from SAN" capability that allows the replacement to gain access and boot from the external storage source that the replaced system was using. The availability of boot from SAN capability simplifies server replacement and reduces the down time associated with returning server resources to an operational state.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Network addresses are generated for information handling system networking components based upon a seed retrieved from a chassis and local network address information. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
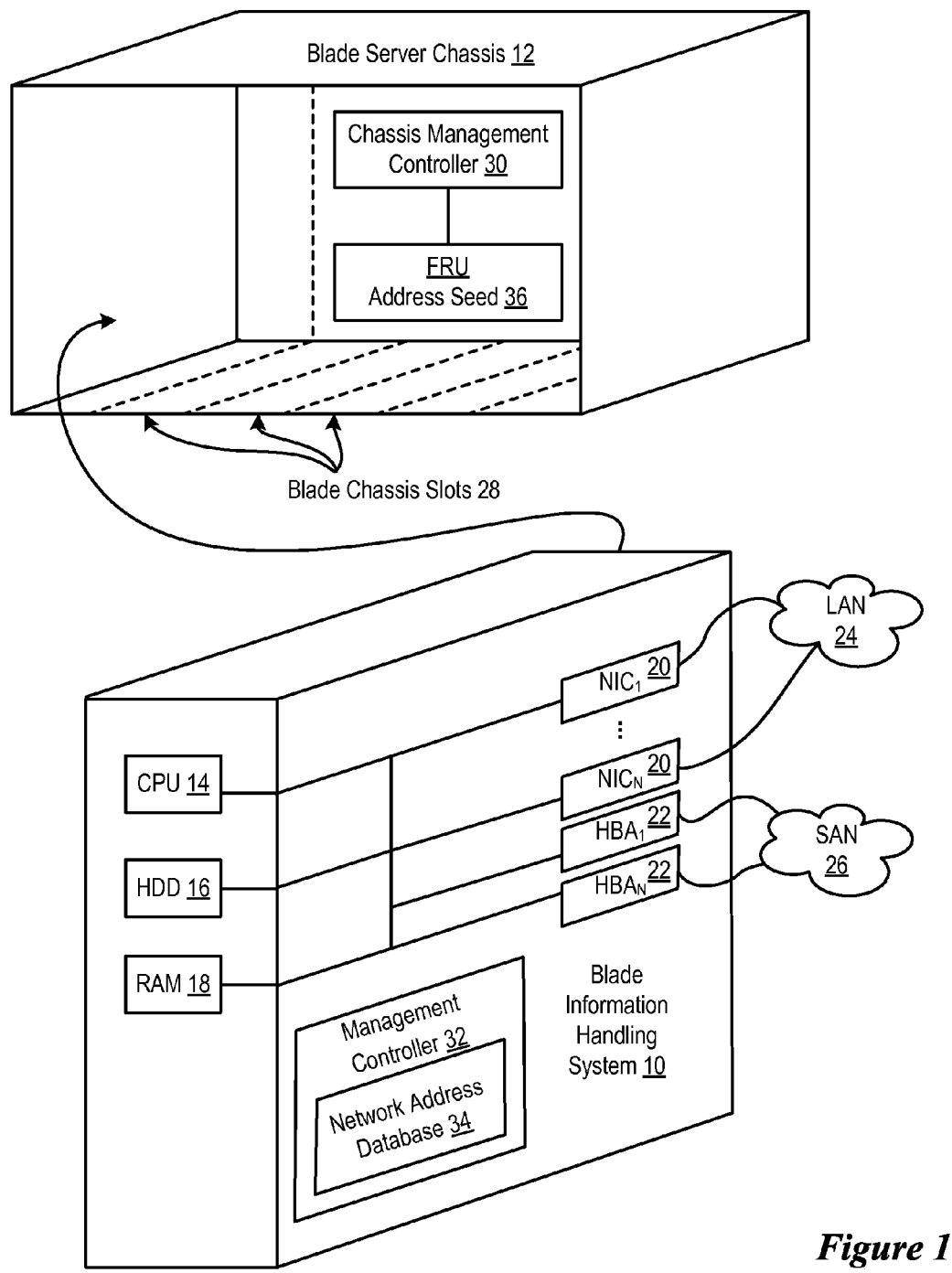
FIG. 1 depicts a block diagram of a blade information handling system and blade chassis configured for dynamic network address allocation.

Referring now to FIG. 1, a block diagram depicts a blade information handling system 10 and blade chassis 12 configured for dynamic network address allocation. Blade information handling system 10 has processing components that coordinate processing of information, including networking components that communicate information over networks. In the present example embodiment, a CPU 14 processes information stored with a hard disk drive 16 or RAM 18 for communication through a network interface card 20 networking component or a host bus adapter 22 networking component. Network interface card 20 communicates information through a local area network 24 and host bus adapter 22 communicates information through a storage area network 26. Blade chassis 12 supports operation of plural blade information handling systems 10 in plural blade chassis slots 28. Blade chassis 12 provides power and cooling at each slot and manages operation of blade information handling systems 10 with a chassis management controller 30. For example, chassis management controller 30 supports remote power up and power down of blade information handling systems 10 by communicating with a management controller 32 located on each blade information handling system 10, such as an integrated management controller (IMC) or a baseboard management controller (BMC). Management controller 32 operates with the other processing components of blade information handling system 10 in powered down states to support remote interaction of chassis management controller 30 with each blade information handling system 10.

A network address generator 34 running on management controller 32 of each blade information handling system 10 dynamically allocates network addresses to networking components of the blade information handling system by reference to a common network address seed store in persistent memory of blade chassis 12, such as FRU 36. Network address generator 34 applies the network address seed from FRU 36 to local network address information associated with its blade information handling system 10 to generate a network address for each networking component, such as network interface cards 20 and host bus adapters 22. For example, local network address information associated with a blade information handling system 10 includes the slot 28 in which blade information handling system 10 resides within chassis 12. The slot number may be determined directly by network address generator 34 or communicated to network address generator 34 from chassis management controller 30. Other types of local network address information include the location of the networking component within blade information handling system 10, such as the mezzanine number, and the port number of the networking component. By applying a common network address seed associated with the blade chassis 12 to local network information, the generated network address has chassis-specific and information handling specific components that provide convenient identification of the networking component. Replacement of a blade information handling system 10 by a similarly-configured system results in similar network addresses assigned to the networking components, thus allowing automated integration of the replacement information handling system in the blade chassis and with the networks. Thus, a replacement blade information handling system is able to power up with a network interface operational to support boot of the blade information handling system from a network location storing the original blade information handling system's image.

As an example of dynamic allocation of network addresses, a WWN network address is generated from a blade chassis seed and local network address information as follows. The WWN address uses the 64 bit IEEE extended address format of the FC-PH standard and is applied to each host bus adapter port of a blade information handling system. For the highest four bits, the Network Address Authority (NAA) is represented. The IEEE Extended addresses have NAA equal to 2. The next 12 bits of the WWN address is assigned a vendor unique code and is populated with network address information local to the blade information handling system. The upper for of these 12 bits denote a world wide node name or world wide port name. The lower 8 of these 12 "local" bits include the blade chassis slot number, the mezzanine location number of the host bus adapter and the port number of the host bus adapter. These lower 8 bits of local network information ensures uniqueness of the WWN within the blade chassis. After the 4 NAA bits and the 12 "local" bits, the next 24 bits are a company identifier, such as an OUI assigned by the IEEE registration authority. The last 24 bits are assigned a unique code by the blade chassis vendor and are populated by the chassis "seed" address stored in persistent memory of the blade chassis. These 24 bits ensure the uniqueness of the generated network address as compared against other blade information handling systems operating in other blade chassis. Each time a blade information handling system powers up, the network address is generated and written over any other network addresses present in the networking component. Generation of the network address at each power up ensures that an address in a newly added blade slot will remain unique and will also remain the same if a blade information handling system is replaced.

Figure 2:
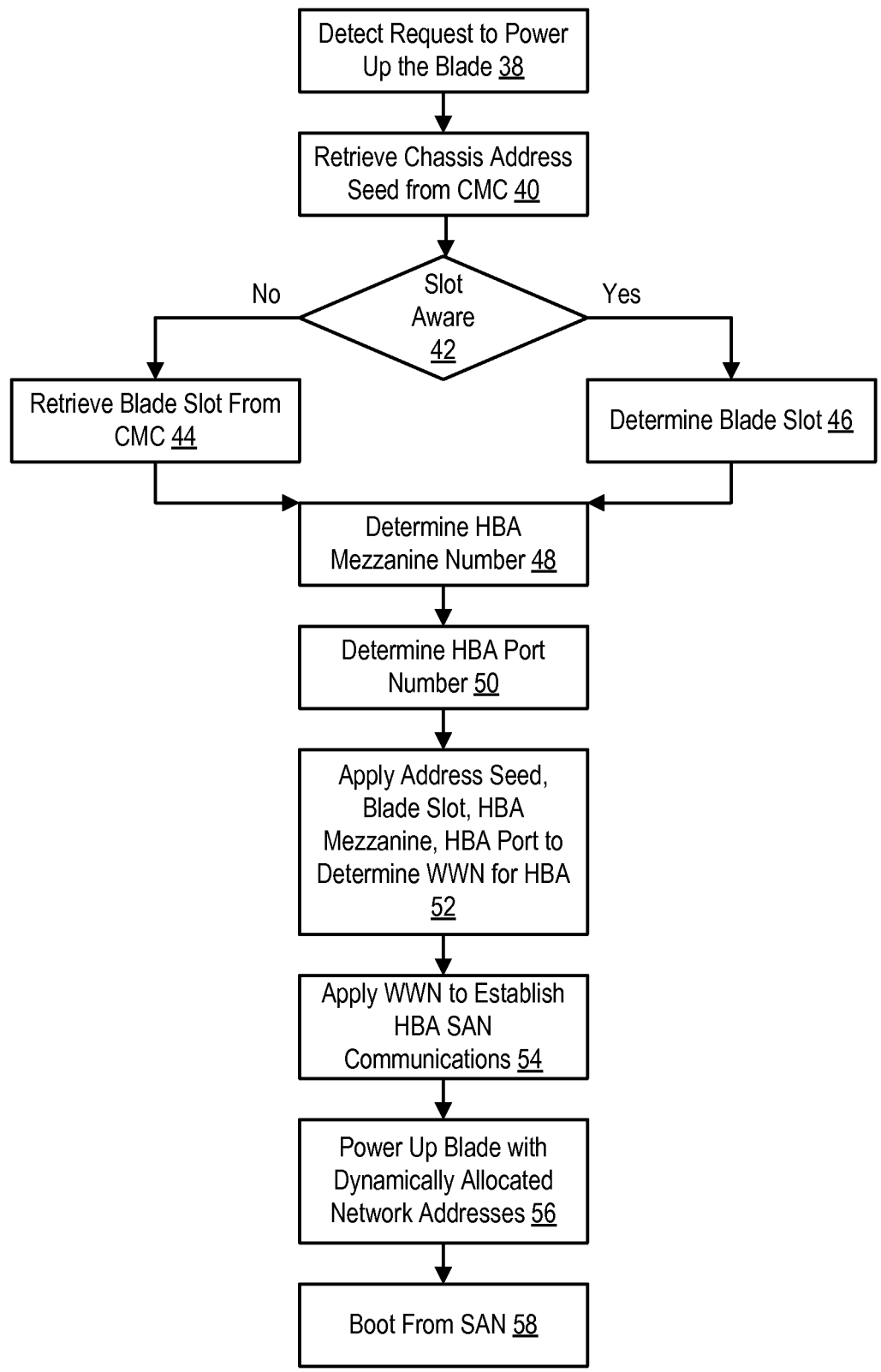
FIG. 2 depicts a flow diagram of a process for dynamic network address allocation.

Referring now to FIG. 2, a flow diagram depicts a process for dynamic network address allocation. The process begins at step 38 with detection of a request to power up a blade information handling system in a blade chassis. At step 40, the chassis network address seed is retrieved by the chassis management controller from the FRU or other persistent memory. At step 42, a determination is made of whether the blade information handling system is slot aware, meaning that it can determine its slot location. If the blade information handling system is not slot aware, the process continues to step 44 to retrieve the blade slot from the chassis management controller. If the blade information handling system is slot aware, the process continues to step 46 for the management controller to determine the blade slot. At step 48, the host bus adapter mezzanine number or other location information is determined. At step 50, the host bus adapter port number is determined. At step 52, the network address seed retrieved from the chassis, the blade slot, the mezzanine number and the port number are applied to determine the WWN for the host port adapter. At step 54 the generated WWN address is applied to establish host bus adapter storage area network communications, such as at power up of the host bus adapter. At step 56, the blade information handling system is powered up with the dynamically allocated network addresses to support network communication. For example, as is depicted at step 58, once SAN communications are available with a dynamically allocated WWN, the blade information handling system can boot from information stored on the SAN.

Although the present invention has been described in detail, it should be understood that various changes, substitutions and alterations can be made hereto without departing from the spirit and scope of the invention as defined by the appended claims.

What is claimed is:

1. An information handling system comprising: processing components operable to process information; one or more networking components interfaced with the processing components and operable to communicate information with one or more networks; a management controller interfaced with the processing components and the networking components, the management controller operable to manage operations of the processing components and the networking components; and a network address generator associated with the management controller, the network address generator operable to retrieve a network address seed from a chassis supporting operation of the processing components, to apply the network address seed and local network address information associated with a position of the information handling system to dynamically generate a network address, and to apply the generated network address to the networking components to communicate information with the networks.

2. The information handling system of claim 1 wherein the chassis comprises a blade server chassis operable to support operation of plural information handling systems in plural slots and wherein the local network address information comprises a slot number.

3. The information handling system of claim 1 wherein the networking components are associated with a location on the information handling system and the local network address information comprises the networking component location.

4. The information handling system of claim 1 wherein the networking component comprises a Fibre Channel host bus adapter and the generated network address comprises a WWN address.

5. The information handling system of claim 1 wherein the networking component comprises a network interface card and the generated address comprises a MAC address.

6. The information handling system of claim 1 wherein the management controller comprises an integrated management controller.

7. The information handling system of claim 1 wherein the management controller comprises a baseboard management controller.

8. The information handling system of claim 1 wherein the local network address information comprises a blade server chassis slot number, an HBA mezzanine number and an HBA port number.

9. A method for allocating network addresses to blade information handling systems loaded in a blade chassis having plural slots, the method comprising: retrieving chassis address information from the blade chassis to a blade information handling system; determining local address information associated with a position of the blade information handling system; applying the chassis address information and local address information to dynamically generate a network address at the blade information handling system; allocating the generated network address to a networking component of the blade information handling system; and establishing network communications through the networking component using the generated network address.

10. The method of claim 9 wherein the applying the chassis address information and local address information to generate a network address further comprises generating a WWN network address.

11. The method of claim 10 wherein allocating the generated network address to a networking component further comprises allocating the generated network address to a host bus adapter.

12. The method of claim 9 wherein the applying the chassis address information and local address information to generate a network address further comprises generating a MAC network address.

13. The method of claim 12 wherein allocating the generated network address to a networking component further comprises allocating the generated network address to a network interface card.

14. The method of claim 9 wherein determining local address information associated with the blade information handling system further comprises determining the slot of the blade chassis in which the blade information handling system resides.

15. The method of claim 9 wherein determining local address information associated with the blade information handling system further comprises determining the location of the networking component in the blade information handling system.

16. The method of claim 9 further comprising booting the information handling system with information retrieved through the network communications established through the network component.

17. A system for allocating network addresses to blade information handling systems disposed in slots of a blade chassis, the system comprising: memory associated with the blade chassis, the memory storing a network address seed; a management controller associated with each blade information handling system, the management controller operable to retrieve the address seed; and a network address generator associated with the management controller, the network address generator operable to apply the address seed to local network address information associated with a position of the blade information handling system to dynamically generate a network address; wherein the management controller is further operable to apply the generated network address to a networking component of the blade information handling system to support communication through the networking component with a network.

18. The system of claim 17 wherein the network component comprises a host bus adapter, the network comprises a storage area network and the local network address information comprises a location of the host bus adapter in the blade information handling system.

19. The system of claim 18 wherein the host bus adapter is operable to communicate over the storage area network to boot the information handling system with information retrieved through the storage area network.

20. The system of claim 17 wherein the network component comprises a network interface card and the network comprises a local area network.

* * * * *